US005735361A

United States Patent [19]

Forrest

[11] Patent Number: 5,735,361

[45] Date of Patent: Apr. 7, 1998

[54] DUAL-POLE PERSONAL TOWING VEHICLE

[76] Inventor: Kenneth R. Forrest, 28030 National Hills, Los Altos Hills, Calif. 94022

[21] Appl. No.: 567,459

[22] Filed: Dec. 5, 1995

[51] Int. Cl.$^{6}$ .......... B62D 51/04; B62M 27/02

[52] U.S. Cl. .......... 180/6.24; 180/19.2; 180/180; 180/68.5; 180/9.21; 180/9.22; 180/6.44; 180/6.48

[58] Field of Search .......... 180/19.1, 19.2, 180/19.3, 6.2, 6.44, 6.48, 6.5, 180, 165, 6.24, 6.58, 6.62, 9, 9.1, 9.21, 9.22, 68.5

[56] References Cited

U.S. PATENT DOCUMENTS

| | | | |
|---|---|---|---|
| 2,369,936 | 2/1945 | Barth et al. | 180/6.2 |
| 2,645,297 | 7/1953 | Wennberg et al. | 180/19.3 |
| 3,380,546 | 4/1968 | Rabjohn | 180/19.2 |
| 3,412,821 | 11/1968 | Humphrey | 180/9.21 |
| 3,419,095 | 12/1968 | Hood | 180/180 |
| 3,444,945 | 5/1969 | Coordes et al. | 180/19.3 |
| 3,557,893 | 1/1971 | Kohls | 180/19.3 |
| 3,791,469 | 2/1974 | Prosser et al. | 180/6.2 |
| 3,826,323 | 7/1974 | Mehne | 180/180 |
| 4,645,022 | 2/1987 | Bergquist | 180/9.22 |
| 5,090,714 | 2/1992 | Seekins et al. | 280/19 |
| 5,540,296 | 7/1996 | Strothmann | 180/19.3 |

FOREIGN PATENT DOCUMENTS

| | | | |
|---|---|---|---|
| 2319618 | 4/1973 | Germany | 180/19.2 |
| 991730 | 5/1965 | United Kingdom | 180/19.2 |

*Primary Examiner*—Eric D. Culbreth
*Assistant Examiner*—Gary Savitt
*Attorney, Agent, or Firm*—Townsend and Townsend and Crew LLP; Kenneth R. Allen

[57] ABSTRACT

A personal traction transportation vehicle which includes two gear-motor-wheels which drive a connected chassis forward. The chassis is stabilized by a third trailing caster wheel. The vehicle is electrically driven by a removable battery pack. At least one and preferably two drag poles simulating ski poles are attached to the chassis through universal joints in a manner allowing the handles of the ski poles to be free to move in the plane normal to the direction of forward movement. The vehicle is steered by either twisting the poles which turn the front two wheels, or by motoring the front drive wheels independently, or by differentially pulling on the drag poles.

21 Claims, 7 Drawing Sheets

10 62 64 45a 42a 66 28a 48a 50a 52 46 66 16 50b 58 45b 60 54 40a 48b 40b 30a 56 12 26 23 30b 22 24 44b 28b 18 20 53

DUAL-POLE PERSONAL TOWING VEHICLE

BACKGROUND OF THE INVENTION

1) Field of the Invention

This invention relates to personal transportation for pulling a user over a variety of base surfaces. More particularly the invention relates to a traction vehicle for pulling a user on in-line skates, skis or ice skates or the like through hand grips to transmit pulling forces to the user while permitting steering.

2) Prior Art

Other pulling vehicle systems are known in the art. The best prior art known to Applicant are U.S. Pat. Nos. 5,385,210; 4,456,089; 3,750,777; 3,797,448; 4,109,732; 3,826,323; 4,096,919; 3,777,835; 5,025,876; 3,635,301; 3,193,038; 4,418,776; and 5,211,254.

The best prior art to Applicant is U.S. Pat. No. 5,385,210 which pertains to a motorized device for pulling a user on inline skates. This vehicle consists of a single wheel with two batteries that sit fore and aft of a single wheel; in addition, two poles with handles extend outward for steering. Though the vehicle will assist a skater under ideal conditions, numerous problems will arise when the user or environment is altered. This is explained as follows:

A) Because the vehicle has only one central wheel and is balanced at the point of tire contact with the road, it is the user who must always maintain the balance of the vehicle. Maintaining this balance could be an impossible task if the vehicle is traversing a sloped surface or if the user does not have sufficient body strength to overcome a vertical shifting of handle position, e.g., going down a hill.

B) While the object of a pulling or towing vehicle is to provide a means of forward movement, it should also provide the user a means of resistance (to move in opposition to), to assist in the balance of the user. If the vehicle has a shifting center of momentum, as the single wheel vehicle does, then its ballast and resistance can not be relied upon in all instances to balance the user. If, for example, negotiating a turn on level ground, centripetal force causes the vehicle and user to become unbalanced in the same vector direction, the single wheeled vehicle will tip in the same direction as the user, thus further aggravating his/her imbalance.

C) Steering a single-wheeled vehicle is difficult because it assumes the user has sufficient strength, balance and control to oppose the forces needed to maneuver an object. Since the steering requires a sufficiently strong and balanced user, it follows that if the user is not balanced, the steering will be inaccurate.

D) The above liabilities are proportional to the weight of the vehicle. This becomes an added problem since the desired power and performance of electric vehicles are directly dependent upon battery capacity; batteries are usually the single heaviest component of an electric vehicle.

E) The pole handles or grips, are affixed to the vehicle which limit the user's freedom of movement—especially in the arms, shoulders and torso.

F) The poles need proper adjustment to fit the height of the user. It follows, therefore, that the poles go out of adjustment as the user bends and straightens his/her legs.

Simply stated, this design does not optimize control, and maneuverability.

Another prior art vehicle system is found in U.S. Pat No. 3,791,469 and is designed for skiers. This vehicle uses a gas-driven engine with a differential and four drive wheels. Using it along a city street or in the back-country will not be as "environmentally" pleasing as using an electric pulling vehicle. This art has only a single handle, which again restricts movement of the arms, shoulders and upper torso, nor does it allow the arms to move independently. Furthermore, steering is accomplished by only one means and that is by braking one wheel at a time through cable operated disc brakes. This method is not only inefficient and heavy, but the braking ability of a tire on a snow surface to turn a vehicle is not nearly as effective as the applicant's pulling vehicle which has three distinct methods of steering, and which all can be used simultaneously.

SUMMARY OF THE INVENTION

According to the invention, a personal traction vehicle is provided for pulling a user, such as a skater, skier, skateboarder, or pedestrian, through drag poles which stabilize the user and permit directional steering without affecting balance of the user. The vehicle comprises a chassis, at least one and preferably two drag poles with ski-pole-like grips preferably incorporating a steering mechanism in each grip and coupled to the chassis through at least one and preferably two corresponding universal linkages by which steering is effected without restricting lateral hand and torso movement of the user. The vehicle further includes drive wheels, or drive tracks, depending on the surface, preferably two front parallel drive wheels and typically a trailing drag wheel provided for balance attached to the chassis with a motor system, preferably an electric motor set, which preferably provides independent power to each drive wheel. Electric motors may be powered by a battery disposed between the drive wheels and the drag wheel and which by its weight provides stability. A feature is the universal linkage between each drag pole and the chassis. The universal linkage, or U-joint, gives stability to the user in the direction of travel while allowing the control grips to be moved in a plane normal to the direction of travel. Steering can be effected by a combination of differentially loading of the drive wheels by pulling one side more than the other through the drag poles, by steering the wheels by rolling the grips sideways, and/or by applying power unequally to the drive wheels. In the preferred embodiment, all three steering options are provided at the hand grip of the drag poles. The grip rolling motion may preferably steer both wheels through a steering linkage on the chassis. Additional load-bearing capability can be provided through a harness adapted to be attached to the torso, so that loading through the drag grips to the arms can be reduced or eliminated.

The personal traction vehicle according to the invention has many optional uses. Electric motors at each drive wheel provides a clean, quiet, and compact option for short distance commuting. Nevertheless, small fuel-powered engines are within the contemplation of the invention. Equipped with a luggage compartment or carrying rack and strong headlights for night travel, a commuter can "ski" to and from work. Used in the form of recreation, the personal traction vehicle enhances an inline skating experience by providing a means of resistance to assist the skater in balancing in the least stable direction, the direction of travel. A novice skater can easily learn to skate by using the pulling vehicle because he/she never has to lift a skate, let alone push the skate from side to side for acceleration; his/her skates are firmly planted on the ground at all times. As the skater advances in skill, he/she may use the pulling vehicle as only an intermittent assist. Thus inline skating is just as much of an aerobic workout as before, but balancing and accelerating assistance "on the fly", is available. In addition to the novice skater, a more advanced skater using the vehicle can travel long distances and at high speeds without tiring. An important application of the vehicle is that the design allows the user who wears inline skates to mimic the correct body movements of an alpine or telemark snow skier.

This pulling vehicle is specifically designed to simulate the downhill skier's movements in a realistic way. Downhill skiers will appreciate that by inline skating down hill, the correct body movements of snow skiing can be mimicked almost identically. Replacing down-hill acceleration (caused by gravity) with an electro-mechanical acceleration allows a user to glide ski on virtually any terrain. Using studded tires or tracks on the drive wheels, a user on ice skates or on skis may also be propelled across ice or snow.

The key features of the pulling vehicle which allow the user to accurately mimic the movements of a "skier" are:

1) The pulling vehicle itself is completely self-supporting. Because it is always stable on all grades of terrain, and the user never supports the vehicles weight, it can't adversely effect the balance of the user.

2) Two ski pole-like drag poles which provide the pulling force to the user, are mounted in such a way that the user has a complete and independent range of movement in the arms, shoulders and chest (except in the plane of pulling fore and aft).

3) The pulling vehicle steers without impinging on the skier's freedom of movement, nor does the vehicle's steering alter the "correct" body positioning required of the skier (a "skier" turns from the waist down, keeping the shoulders perpendicular to the "fall line" of the slope).

4) The universal joints which connect the ski poles to the steering column, allow the ski poles handles or grips to move freely in the left-right & up-down planes. Therefore, the poles are always positioned correctly for any size user and adjust automatically to any changes in height which occur over hilly terrain. Again, no forces from the vehicle can be transmitted back to the skater/skier, except for the forward pulling forces.

The invention provides the user:

1) a powerful, quiet and efficient pulling force 2) a means of stability and balance 3) precise control and maximum performance during operation 4) minimum effect on the body's natural movements and flexibility The vehicle's design also offers a "user-friendly" portability which makes transporting and handling the device easy. The central battery case houses the batteries and electronics, and is equipped with receptacles that receive the motor and throttle/switch plugs. When the plugs are disconnected, the entire case slides out from its rack and may be carried by its handle. Once the poles are removed from the main frame via quick-disconnects, the whole machine can easily fit in a small closet.

The invention will be better understood by reference to the following detailed description in connection with the accompanying drawings.

DESCRIPTION OF SPECIFIC EMBODIMENTS

Figure 1:
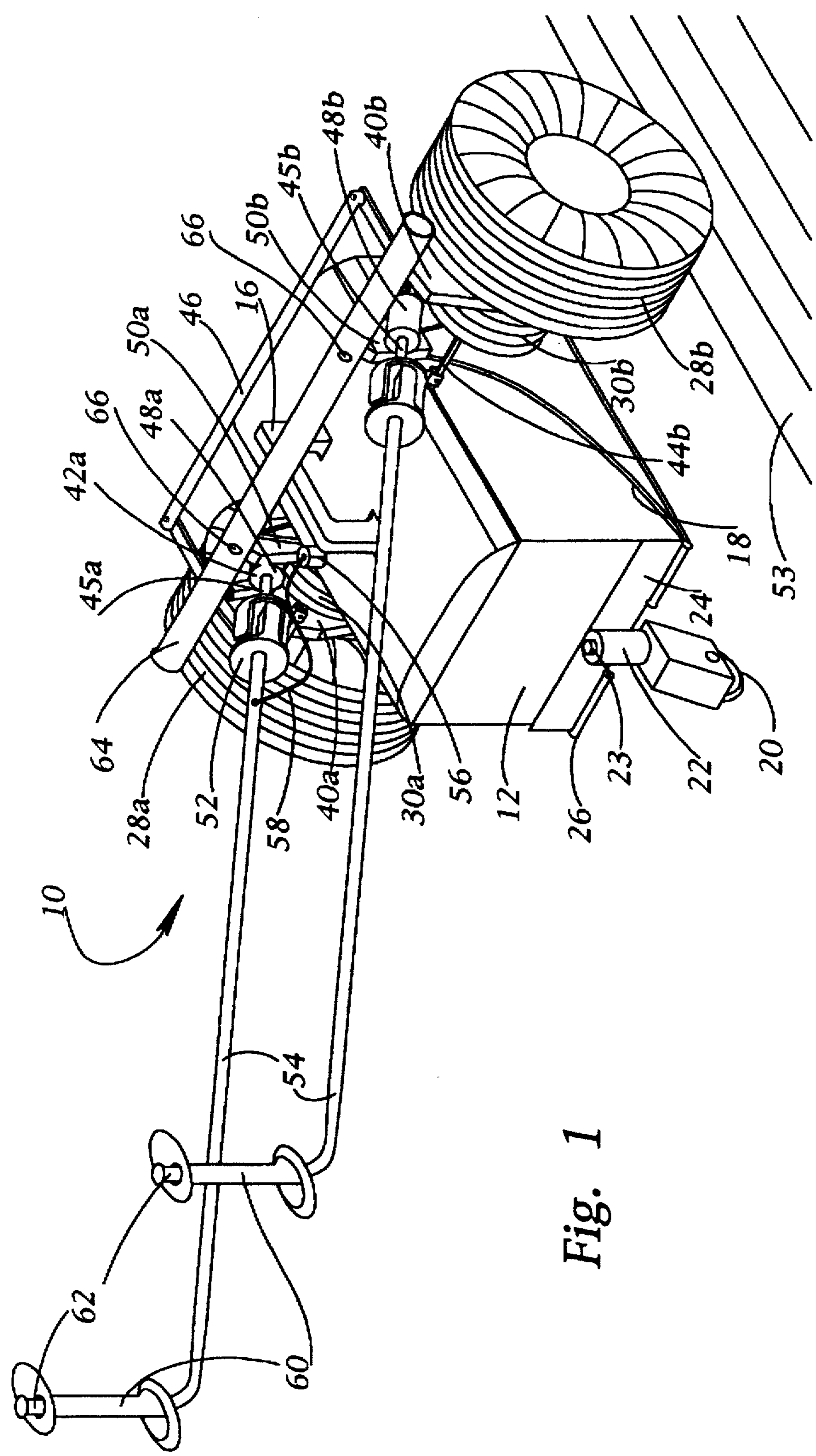
FIG. 1 is an isometric view of a personal traction vehicle for use on hard surfaces according to the invention.

FIG.1 shows the traction vehicle 10, which is assumed to pull any type of user wearing or using ice skates, skis, roller skates, inline skates or the like. The battery case 12 with carrying handle 16, sits in its battery rack 18 between the two drive wheels **28*a* & 28*b*. The third wheel 20 is a small caster wheel mounted to its yaw bearing sleeve 22. Inside the yaw bearing sleeve 22 are top and bottom bearings (not shown), which support the caster block yaw axle 23. While the bottom bearing is a simple (doughnut shaped) sealed ball bearing cassette, the top bearing is a similarly shaped thick plastic washer. The caster wheel 20 and caster block bearing with axle 22 & 23, mount to the battery rack's tail-gate 26. This tailgate moves up and down on its hinge 24. Elements 30*a* & 30*b* are the left and right motors respectively and mount to their corresponding motor mount steering brackets 40*a* & 40*b*. These brackets 40*a* & 40*b* are affixed to the sleeves of the wheel mount steering bearings 42*a* & 42*b*. The center pins of these bearings are affixed to the main-frame connecting bar 64. Along the connecting bar 64 are two harness attachment points 66. The left and right rod-ends (back) connect between the steering brackets 40*a* & 40*b* and the left and right steering columns 45*a* & 45*b*. The rod-end (front) 46 mounts to the two steering brackets 40*a* & 40*b*. The ski pole steering column bearings 48*a* & 48*b* house the steering columns 45*a* & 45*b*, and are attached to their respective steering column bearing mounts 50*a* & 50*b*, which then attach to the main-frame connecting bar 64. The universal joints connect between the steering columns 45*a* & 45*b* and the drag poles 54. The power and control wires 58 coming out of the ends of the drag poles 54 are equipped with termination plugs 56. On the raised ends of the drag poles 54 are the drag pole grips 60 which house the control throttle/switches 62**.

Figure 2:
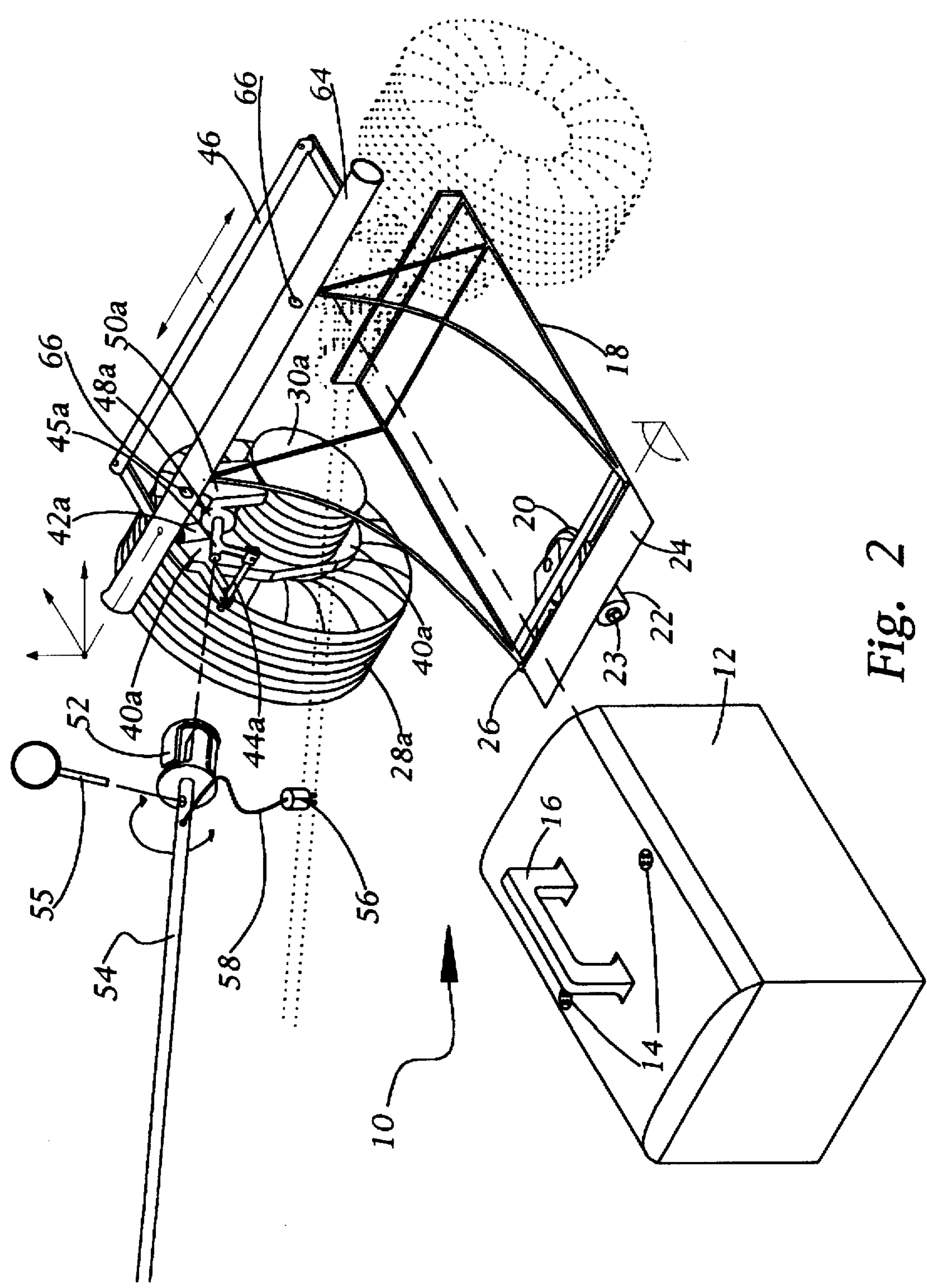
FIG. 2 is an isometric view of the personal traction vehicle which illustrates the steering system and the battery case.

FIG. 2 shows the battery case 12 removed from its rack 18 and the rack's tail-gate 26 folded down with the caster wheel 20 tucked underneath. In addition, the universal joint 52 is pulled away from the steering column **45*a*; this shows better detail of the left side components which include the motor 30*a* connected to the motor and wheel mount steering bracket 40*a* which rotates around the motor mount steering bearing 42*a*. The sleeve of this bearing assembly is affixed to the main-frame connecting bar 46. FIG. 2 also shows how the steering column 45*a* is connected to the motor mount steering bracket via the left steering rod-end (back) 44*a*. FIG. 2 also shows the drag pole connecting pin 55**.

Figure 3:
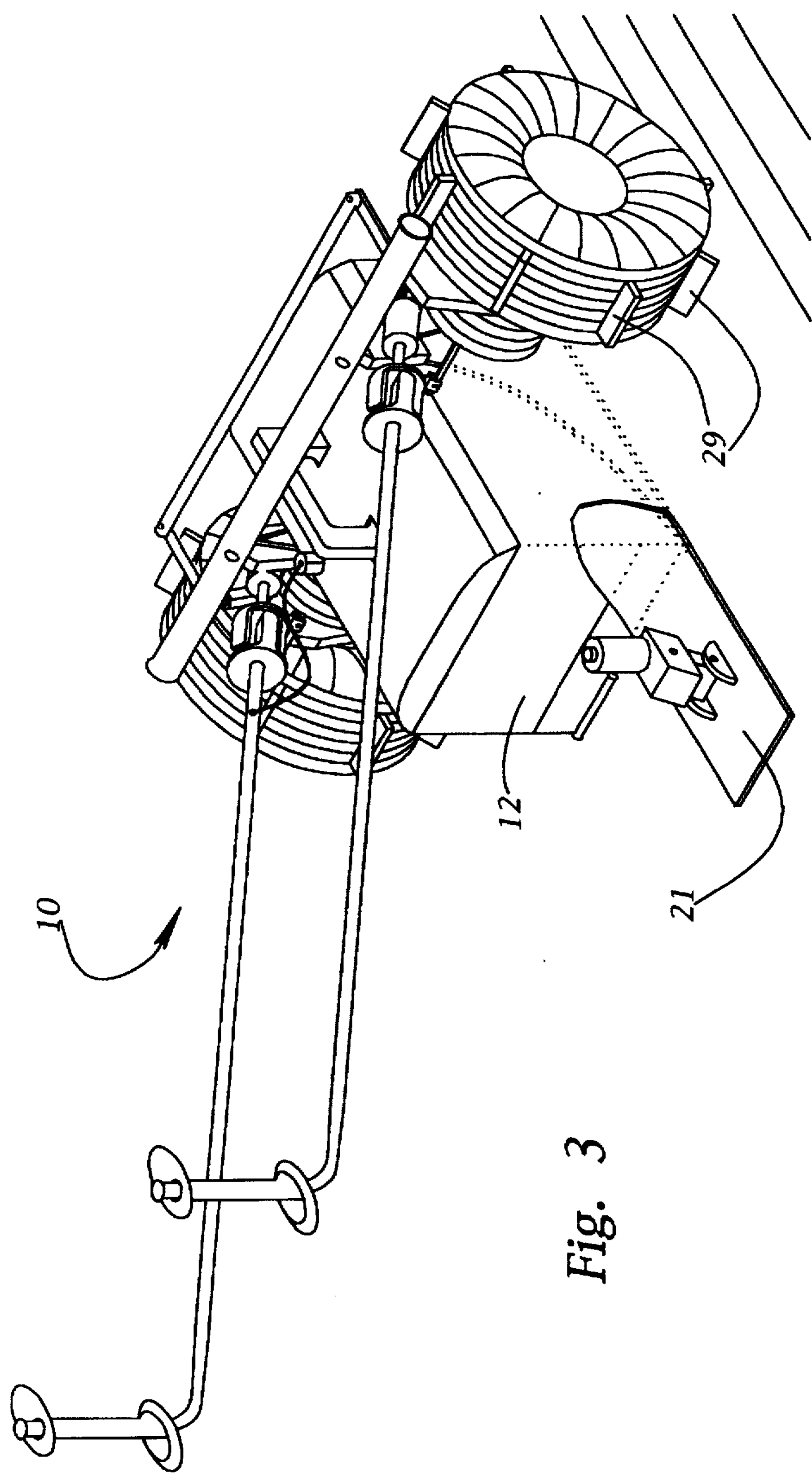
FIG. 3 is an isometric view of a personal traction vehicle for use on ice or snow-covered surfaces using a caster drag rail and drive tracks.

FIG. 3 shows a vehicle according to the invention. In this embodiment a single caster drag rail 21 is provided as a trailing support and two sets of drive tracks 29 are provided for power transmission to the surface, such as ice or snow.

Figure 4:
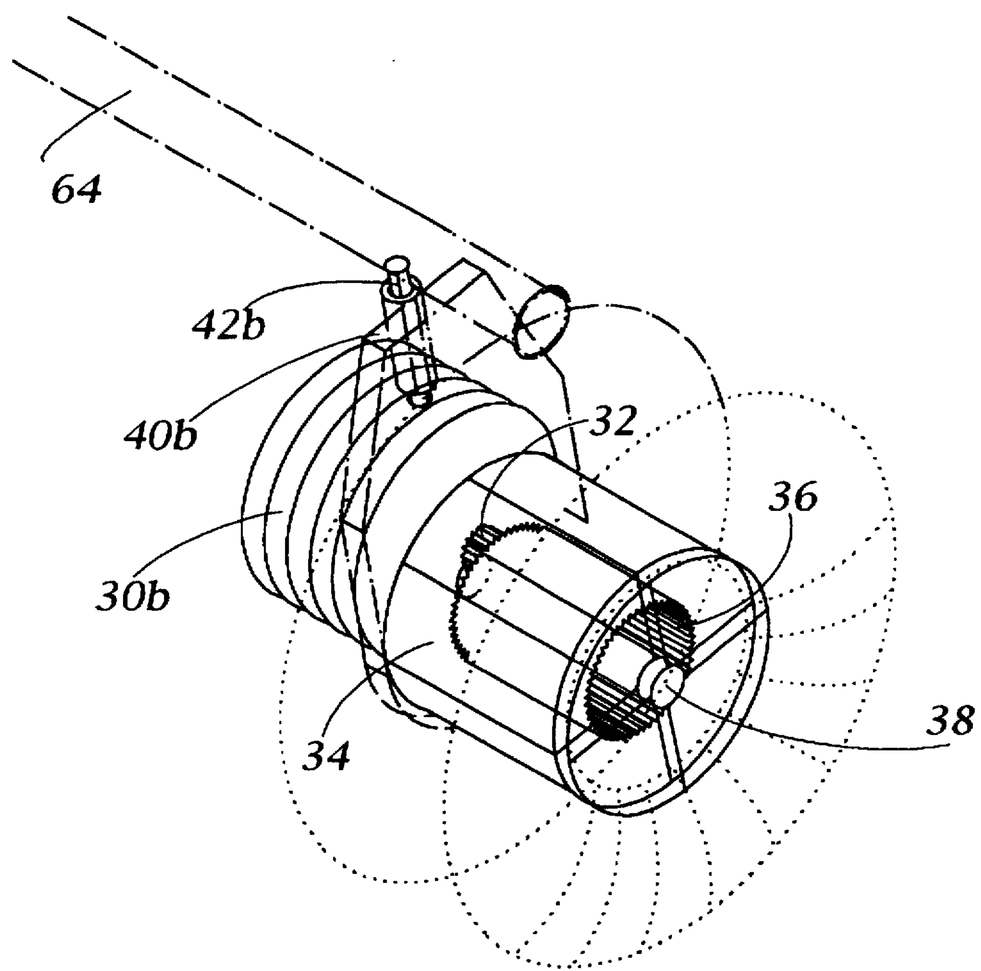
FIG. 4 is an isometric view of a motor and its attaching gearhead which mounts inside of the wheel hub.

FIG. 4 highlights the internal gear-motor transmission system, mounted inside the hub of each wheel (FIG. 3 only shows the right side wheel hub; however, the left side is the mirror image of the right). Fastened underneath to the main-frame connecting bar 64 is the center pin of the motor and wheel mount steering bearing **42*b*. The sleeve of this bearing is fastened to the motor and wheel mount steering bracket 40*b*. Two components are firmly affixed to this bracket; they are: the motor 30*b* (with its drive-gear 32 piercing through the bracket) and the hub axle and bearing 38. The hub 34 spins around this axle and bearing 38 at an attachment point toward the end of the axle. The toothed gear inside diameter hub surface 36 mates with the drive gear/motor shaft to turn the hub 34**.

Figure 5:
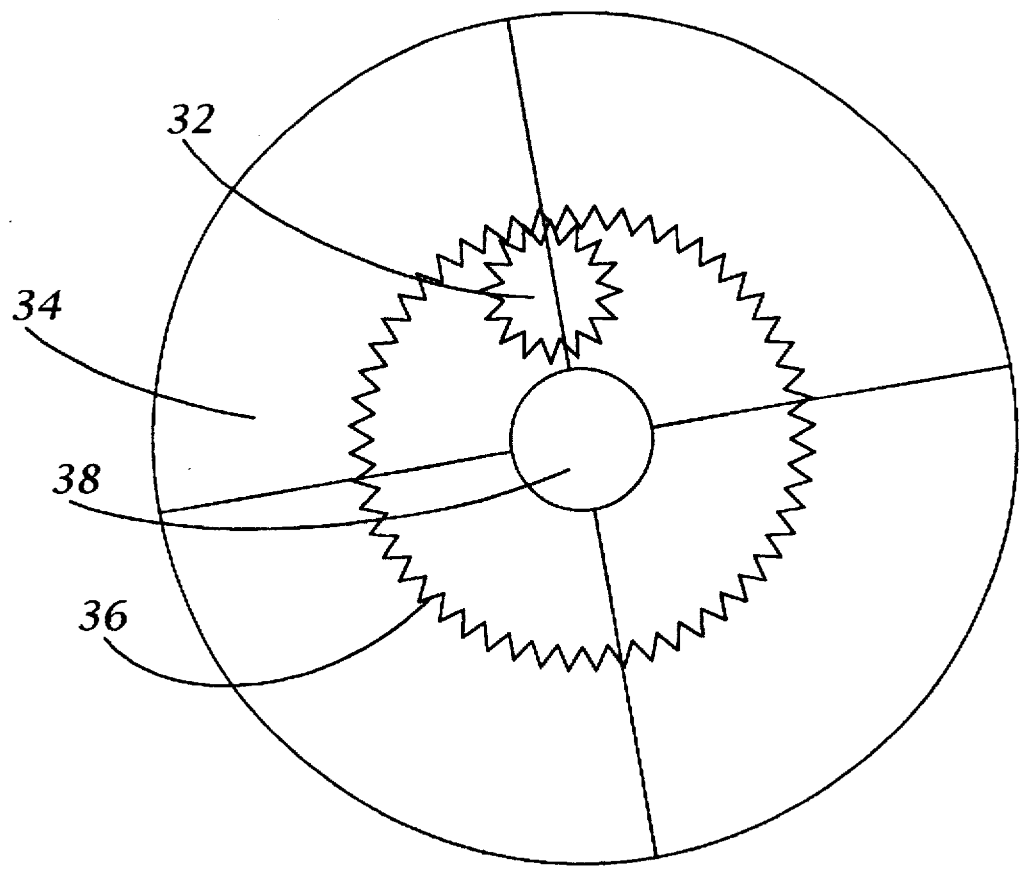
FIG. 5 is a side view of the gear-motor assembly.

FIG. 5 shows a side view of the internal gear-motor transmission system mounted inside the hub of each wheel. The drive-gear/motor shaft 32 mates against the inside diameter hub surface 36 of the hub 34 which spins around the hub axle and bearing 38.

Figure 6:
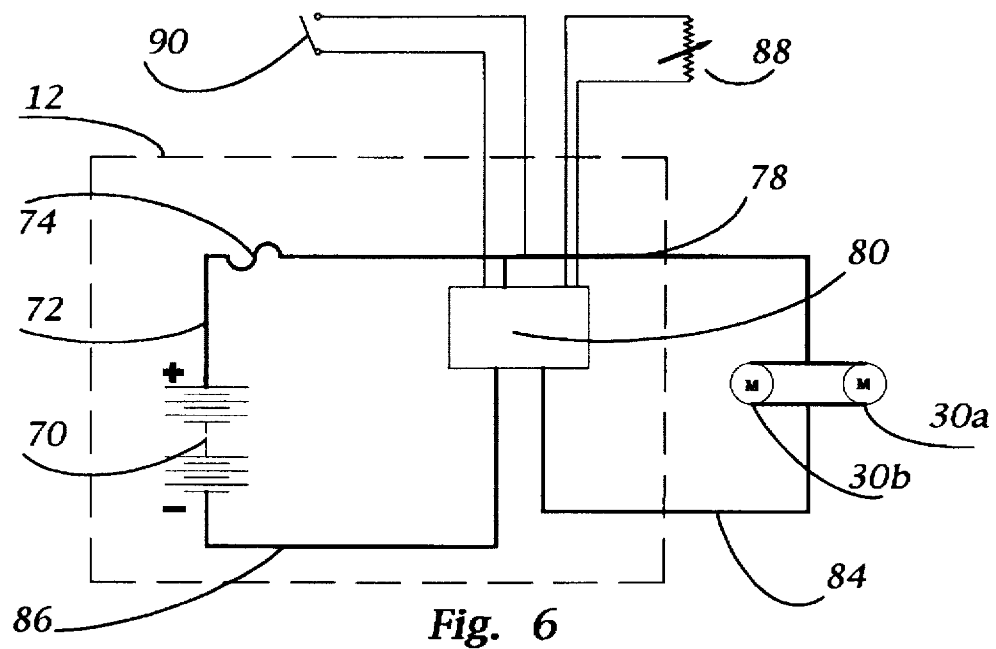
FIG. 6 is the wiring diagram of the vehicle's power components using a single motor controller.

FIG. 6 is the wiring diagram of the vehicle's power components using a single motor controller. Battery pack 70 connects to wire 72 through breaker/fuse 74. Positive battery voltage is measured on wire 78 and connects to key switch 90, motor speed controller 80, and motors **30*a* & 30*b*. Wire (motor negative) 84 connects the motors 30*a* &30*b* with controller 80. Wire (battery negative) 86 connects the controller 80 with battery negative 86. Wire (battery positive) 78 also connects to the controller 80, via the key switch 90. The rheostat's two terminals connect to the controller 80. The dash-lined rectangular box represents the battery box 12** and thus shows the electrical hardware enclosed within this case.

Figure 7:
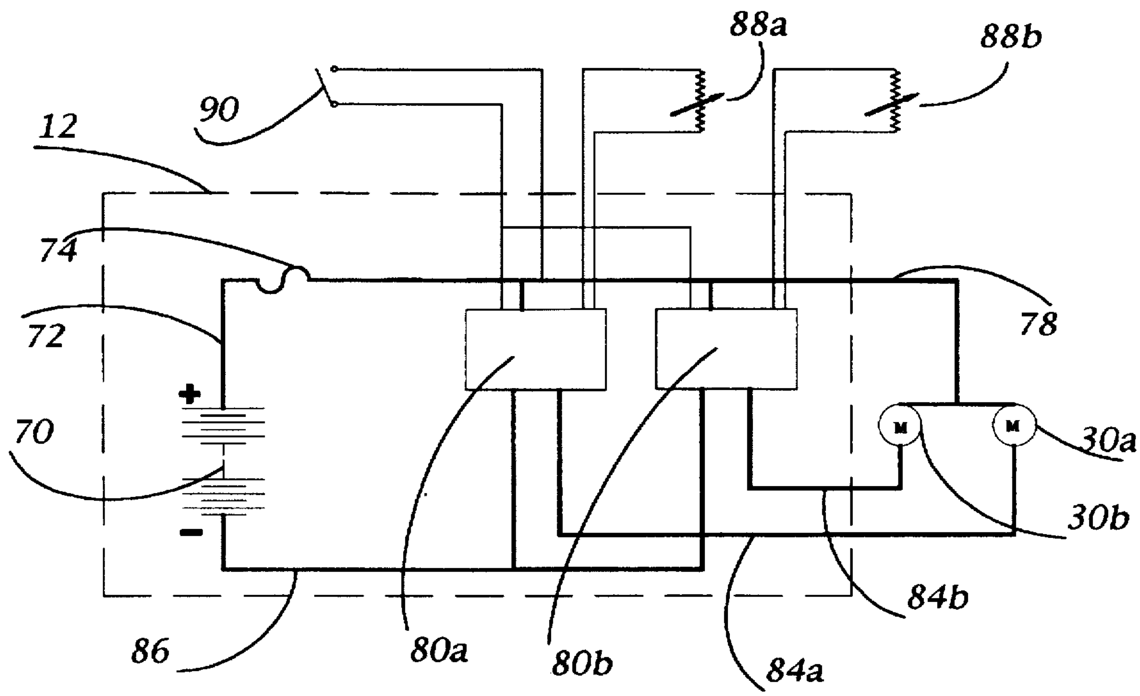
FIG. 7 is the wiring diagram of the vehicle's power components using two motor controllers.

FIG. 7 is the wiring diagram of the vehicle's power components using two motor controllers. This wiring diagram is identical to FIG. 6 with the exception of several alterations: Instead of a single wire (motor negative) 84 there are two: **84*a* & 84*b*. Each wire connects between their respective motors 30*a* & 30*b* and the controllers 80*a* & 80*b*. Each controller is operated by a throttle rheostat 88*a* & 88*b***.

Figure 8:
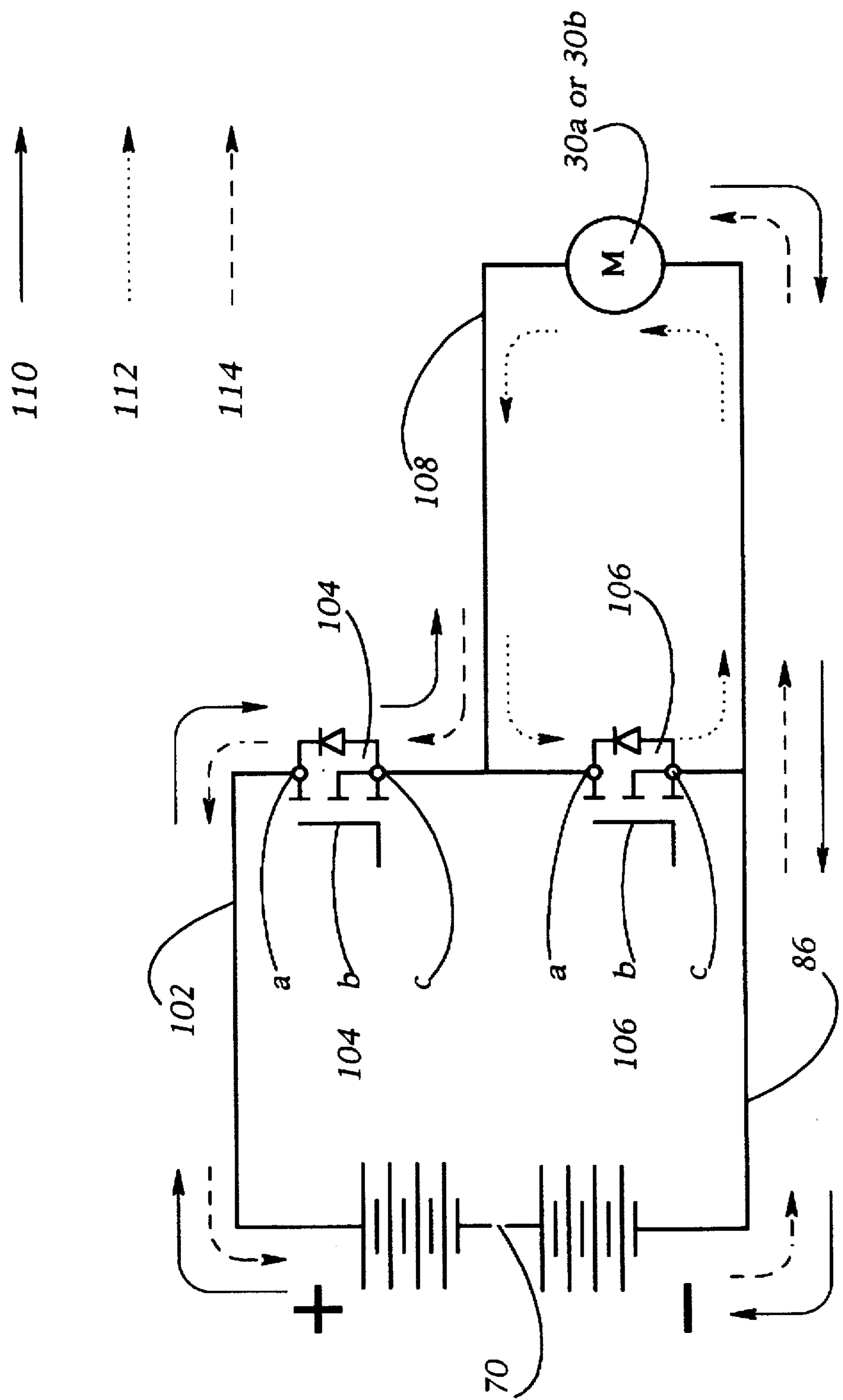
FIG. 8 is a wiring diagram of the vehicle's electrical power flow during its driving and regenerative braking modes.

FIG. 8 is a simple wiring diagram of the vehicle's electrical power flow showing the four main components that allow the vehicle to accelerate forwards, and brake regeneratively. The batteries 70 have a positive wire connection 102 that connects to the "drive" power transistor 104 at its drain connection **104*a*. The transistor's gate connection 104*b* connects to the throttle's rheostat 88 (of FIG. 6 & 7). The drive transistor's source connection 104*c* connects to the motor(s) 30*a* & 30*b* as well as the drain of the "regenerative braking" power transistor 106*a*, all through the wire (motor positive) 108. Wire (battery negative) 86 connects three components together: the motor(s) 30*a* & 30*b*, the source terminal of transistor 106, at 106*c*, and the battery pack 70. Solid-lined directional arrows 110 show the flow of circuit current when the motors are driving the vehicle. Dotted-lined directional arrows 112 show the motor's armature induction build-up of current. The dashed-lined directional arrows 114** illustrate the flow of circuit current when the motors are braking and recharging the batteries.

OPERATION OF INVENTION

On Pavement or Hard Road Base Surfaces

FIG. 1 shows the pulling vehicle 10. It will pull an individual who may wear but is not limited to wearing ice skates, skis, roller skates, inline skates, who is walking or hiking, or rides a skateboard or in a wheelchair or in any other type of support system. The battery case 12 houses most of the electric hardware and all the batteries. Electric hardware includes an electronic motor controller which regulates the speed of the motors and all the electrical outlet terminals. Because the battery case 12 is heavy, from the many batteries stacked in series/parallel combinations, it's designed as a modular unit, and slips in and out of the vehicle's chassis for convenience (shown later in FIG. 2). The battery case comes with a carrying handle 16 for easy transport, and the handle assists in sliding the case in and out of its battery rack 18. On either side of the battery case 12 are the respective right and left motor/wheel assemblies both of which turn as a single unit when the pulling vehicle 10 is steered. The components and their function of the left gear-motor-wheel assembly is either identical to, or mirror images of the right gear-motor-wheel assembly.

FIG. 2 best illustrates the gear-motor-wheel assemblies where the left assembly is shown in detail. Pictured in FIG. 2 is the left drive wheel **28*a* as a racing slick "go-cart" tire. The two tires extend far enough away from the front of the vehicle so that it can "climb" sidewalks. Though this type of tire construction is ideal for pavement, it may be replaced with other wheel types depending upon the base surface environment (see "Preferred Pulling Vehicle Snow Base Surface" & "Preferred Pulling Vehicle on Ice, Snow and Dirt Base Surface"). The tire mounts over a motor-wheel hub (described later in FIG. 3). This wheel hub is also the driven gear of a gear-motor assembly. All the gearing may take place inside the wheel hub. The left motor is shown 30*a* mounted to the left motor and wheel mount steering bracket 40*a*. This steering bracket is free to turn on its steering bearing 42*a*. Steering this whole gear-motor-wheel assembly causes the tire 28*a*, gearing, motor 30*a*, and steering bracket 40*a*, to turn as a unit —turning is caused by the lateral movements of left steering rod-end (back) 44*a*. The horizontal rod end 44*a* pushes the steering bracket 40*a* left or right as the left steering column 45*a* is turned by the operator's ski poles 54. Twisting the ski poles right will thus turn the tires right. The left steering column 45*a* is housed by the left steering column bearing 48a which is affixed to the main frame connecting bar 64 by its bearing mount 50*a*. Either right or left drag poles will turn both motor-wheel assemblies together because the steering rod-end (front) 46 links together both steering brackets 40*a* &40*b*. Both right and left drag poles 54 connect to their respective steering columns 45*a* & 45*b* via universal linkages, or universal joints 52. The preferred universal joint is made of light-weight nylon plastic. The universal joints 52 allow the drag poles 54 and thus the drag pole grips 64 to move freely only in the left-right & up-down directions. This provides an automatic and infinite variation of ski pole grip positions for any size operator of the vehicle. Twisting the poles along their longitudinal axes, twists the universal joints 52 and thus turns the two steering columns 45*a* & 45*b***.

Two of the key features of the vehicle are compactness and portability. By allowing some of the pieces to detach from the vehicle, the machine can easily transport in a trunk of a car or be stored in a closet. The vehicle breaks down into three main pieces: 1) drag poles 2) battery case 3) chassis 1) Both drag poles detach from the vehicle at the point between the universal joints 52 and the drag poles 54. The coupling of these two components is held together by the drag pole connecting pin 55. In addition to this mechanical connection, both drag pole electrical plugs 56 (FIG. 1), have to be removed from the battery case 12. The wires from these plugs run up the drag poles 54 and connect to the throttle/switches 62 and headlight switches (not shown).

2) The battery case 12 easily slides in and out of its battery rack 18. To remove the battery case, the caster wheel 20 is turned 90 degrees in its caster block bearing 22 so that the caster wheel axle is perpendicular to the battery rack tailgate hinge pins 26 (FIG. 2). With the caster 20 pushed up against the battery rack tailgate 24, the whole unit (caster 20, caster bearing 22, and tailgate 24), folds down so that the tailgate lies flat. Now, the battery case 12 is free to slide out. The battery case rack 18 and tailgate 24 are mounted to the caster block bearing 22 in such a way that the weight of the battery case 12 keeps the caster bearing 22 and tailgate 24 pushing up against the case; i.e., the case's own weight keeps it tightly secured in its rack. The fit between the battery case 12 and battery rack 18 is sufficiently tight as to not allow the case to move in any directional plane. The two battery rack tailgate hinge pins' axes, are slightly out of line with one another. This allows the tailgate's hinge to be stiff enough so that it will never open in the event that the caster wheel becomes unloaded during vehicle operation. Only with the firm force of the hand can the tailgate be opened downwards.

3) Without the drag poles and battery case attached to the pulling vehicle, only the skeletal frame, steering assemblies, wheels and gear-motors remain as a unit (chassis). This rectangular chassis is easily carried in the center of the main-frame connecting bar 64. Two headlights are mounted on this connecting bar for traveling at night. During normal operation, the two large drive wheels **28*a* & 28*b* propel the vehicle forward while the trailing caster wheel 20 swivels in the direction of the vehicle. The caster block bearing sleeve 22 houses the two bearings which support the caster block yaw axle 23**. The bottom bearing is a simple (doughnut-shaped) sealed ball bearing cassette; the top bearing is a similarly shaped thick plastic washer. When the nut on the yaw axle tightens down on the plastic washer bearing, it creates friction resistance between the nut and the bearing. This provides resistance dampening to the caster's yawing and the caster won't "flutter" as a shopping cart caster occasionally does.

Not shown, but part of this assembly is the vehicle's cowling or body shell; the cowling not only covers and protects all the components, but improves the aero-dynamics and appearance of the pulling vehicle.

FIG. 3 shows the pulling vehicle with drive tracks 29 in place of tires, and a single caster drag rail 21 in place of the caster wheel 20. The surface of the drive track is similar to that of a snow machine's track or to that of a knobby-tire terrain vehicle, so that the drive track 29 provides positive traction over snow, ice, or a loose or slippery base surface.

FIG. 4 provides a detailed explanation of the right side gear-motor-wheel assembly (the left side motor-wheel assembly is the mirror image of the right). There are really three main components of this assembly: the tire or wheel, the transmission system and the motor. They are discussed in more detail as follows:

1) The right tire or drive wheel **28*a* & 28*b* (already described in FIG.(S) 1 & 2**), is shown in dotted outline.

2) Connected to the wheel in a cylindrical form, is the wheel-hub/driven-gear 34. This hub is shaped like a large coffee mug with toothed gears affixed to the inside walls. The "bottom of the mug" is the end-face of the hub which at its very center, houses the hub axle and bearing 38. The other end of the hub axle 38 attaches to a bearing affixed to the motor and wheel mount steering bracket **40*b*. The open end of the hub("lip of the mug"), thus fits against the (near) face of the wheel mount steering bracket 40*b*** and has a plastic delrin edge so that it may easily slide over the bracket's face.

3) The motor **30*b* mounts onto the (far) face of the wheel mount steering bracket 40*b*. Protruding through this wheel mount steering bracket face 40*b* is the small drive-gear attached to the motor's shaft 32. The small drive-gear 32 is carefully positioned so that its teeth mesh with the inside diameter hub surface 36** which then turns the whole wheel and hub assembly.

The whole gear-motor-wheel assembly all pivot on the wheel mount steering bearing sleeve **42*b* where the shaft of this bearing is affixed to the main-frame connecting bar 64**.

FIG. 5 shows the side view of the gear-motor-wheel assembly. Note how the drive-gear/motor shaft is not in line with the hub axle 38. While this illustration shows a transmission gear ratio of 3.25:1, enlarging the inner diameter of the hub would produce larger gear ratios for the wheel's transmission, translating to higher torque at the wheel. Alternatives to using two gear-motors, may include high torque motors which don't require gearing, a larger single motor with a differential axle, or motors with belt drive transmission systems.

FIG. 6 shows the wiring diagram of the vehicle's power components using a single motor controller. The battery pack 70 is made up of many rechargeable battery cells which when interconnected in series parallel combinations, provide sufficient torque and speed to the pulling vehicle. The positive battery terminal connects to wire 72 which terminates at breaker/fuse 74. This breaker switch 74 acts as an on/off and safety switch, and it's ideally located on the drag pole grip 60 (switch not shown). Another kill switch 90, may be incorporated near the ski pole grip 60 (switch not shown on drag pole), to ensure that the vehicle never runs away from the user, e.g., a switch activator that connects to the user's wrist (jet skis have such a safety device). Positive battery voltage is measured on wire 78 where a volt meter or indicator lights (which monitor the battery pack's state of charge) are connected and displayed on the vehicle's chassis (this voltage indicator is not shown). Wire 78 is both the battery positive wire and the motor positive wire, and also connects to the motor speed controller 80. Wire (motor negative) 84 connects the speed controller 80 with the motors **30*a* & 30*b*, while wire (battery negative) 86 connects the negative battery terminal to the to the motor speed controller 80. The dashed lined box, represents the battery case 12** and illustrates which components are housed inside this enclosure.

Motor Speed Controllers: Because the scope of motor speed controlling goes well beyond the limits of this writing, a single type of motor control is briefly explained that works very well for the pulling vehicle. If the two motors **30*a* & 30*b* are direct current (DC) electric motors, then a DC motor controller is used. The controller has power transistor circuitry which provide a "chopper", variable pulse width, or ramping voltage signal to the motor's armature, thus producing specifically desired motor speeds. A small DC signal operated by a rheostat 88 controls or modulates the high power ramping voltage signal. In the pulling vehicle this rheostat 88 is mounted inside the right drag pole grip 60 (FIG. 1**), and is operated by the right thumb. A common method of motor speed control is called pulse width modulation (PWM). These controllers find their way into numerous consumer goods, such as cordless power tools, forklifts and wheelchairs. They are also commercially available, e.g., Curtis PMC of Dublin, Calif. makes numerous models.

FIG. 7 is the wiring diagram of the vehicle's power components using two motor controllers. The advantage of using two separate motor controllers is that the speeds of the motors are now independent of one another which allows the pulling vehicle 10 to be steered by its motors; an electric wheelchair steers similarly as its two rear motors turn at different rates. The only other differences in FIG. 7 that are not found in FIG. 6 are as follows:

1) instead of a single wire (motor negative) 84, there are two, 84*a* & 84*b*.
2) Each of these wires connect between their respective motors 30*a* a 30*b* and their controllers 80*a* & 80*b*.
3) Each controller is operated by its own separate throttle rheostat 88*a* & 88*b*.
4) These rheostats are mounted inside of their respective drag pole grips 60 such that the user's thumbs raised vertically, operate a spring throttle mounted on the top of the grip 62.

FIG. 8 is a simple wiring diagram which shows the vehicle's electrical power flow during its driving and regenerative braking modes. During the drive mode, current flows from the batteries 70 along wire (battery positive) 102 and into the drain terminal of transistor 104 at 104*a*. When the transistor's base 104*b* is turned on by the throttle rheostat 88, a voltage signal of varying magnitude appears at the transistor's drain terminal 104*c*. Current then flows through the transistor and into the motor(s) 30*a* & 30*b* via wire (motor positive)108 returning to the batteries 70. The direction of this circuit loop of current during the motor's drive mode is shown by the solid-directional arrows 110. When the operator of the pulling vehicle decelerates by "letting up" on the thumb throttle, a control signal runs to the gates of transistors 104 &106 at 104*b* & 106*b*, allowing the motor current to flow in such a way, that any kinetic energy from the spinning motor armature, builds up a magnetic field and a corresponding current which is stored in the circuit loop designated by the dotted arrows 112. When transistor 106 is turned off, the stored current in the loop runs back through the diode of transistors 104, and into the battery pack. This path of current which charges the batteries is designated by the dashed arrows 114.

On Snow Base Surface

The preferred pulling vehicle used on a snow covered surface for pulling a user who wears a pair of snow skis, snow board, or other sliding device under the body, functions much like the pictured pulling vehicle 10 as shown in FIG. 3. Multiple wheels or "belt tracks" or drive tracks 29 replace the existing drive wheels 28*a* & 28*b*. Belt tracks would be of similar construction and material as to those found on "snow machines" such that a single belt would wrap around two or more wheels, whereby, the two wheels inside the single belt track are positioned on a line which runs parallel to the direction of travel. When a trailing caster drag rail 21 is used on the pulling snow vehicle, it is mounted with enough movement at its connection and far enough from the chassis so that its blade tip moves freely and unencumbered. The snow base pulling vehicle uses three methods to steer the vehicle, and they can be implemented simultaneously or individually. They are:

1) Each right and left wheel or belt track is motored independently, thus the vehicle will turn in the direction of the slower moving motor, wheel or track. Additional performance of this steering method is the ability for each motor to brake electrically, or wheel/track to brake mechanically. Simply backing off from either right or left throttles, allows the motors' power circuit to brake regeneratively, thus causing the motors to brake and the batteries to recharge.
2) The second method for steering the pulling snow vehicle is to turn the right and left wheels or tracks on their vertical center axis points by twisting the drag poles 54 on their longitudinal axis FIG. 3. Although this method of steering is very effective since it allows the machine to "crab" left and right while shoulders and upper body remain firmly positioned, power steering or other remote control device could be incorporated for the wheels/tracks to turn.
3) The third method of steering is by using the arms and shoulders to push and pull the drag poles 54 fore and aft. This method spins the entire vehicle on a vertical axis located mid span of the mainframe connecting bar 64. When two or three methods of steering are used in conjunction with one another, literally "turning on a dime" or high speed precision turning is easily accomplished.

In the event that the user travels up steep slopes or over long distances, a harness or support mechanism will be desired to pull the user from a point other than from the hands. The support harness pulls from the arms shoulders or waist and has a quick release mechanism to disconnect the user from the vehicle at any time. This harness connects to the main-frame connecting bar 64 at two screw-hole harness attachment points 66.

Preferred Pulling Vehicle on Ice, Snow and Dirt Base Surface

In an environment where ice, hard snow, dirt or sand is traversed by the pulling vehicle, the drive wheels 28*a* & 28*b* are equipped with tire studs or knobby tires to provide an aggressive means of traction between the tire and base surface. The user wears skis, ice skates, wheeled or tired skates, snow or skate boards or any other platform that is used to carry the body, including feet, i.e., when the pulling vehicle supports a rack or carrying compartment, it is ideal for carrying groceries or packing equipment over groomed camping trails.

For off-road and high-performance use, the pulling vehicle is equipped with a fully suspended chassis.

Summary, Ramifications, and Scope of the Invention

The vehicle according to the invention is a universal, compact, portable, powerful and high performance, recreation/commuting machine. It can pull the user over a number of base surfaces in the most efficient manner for both machine and operator. Two independent and freely movable "ski poles" or drag poles, act as the steering wheel and transmit the machine's pulling force to the driver.

The pulling vehicle is especially suited for the skier or inline skater because it is specifically designed to simulate a skier's correct body movements while traveling on a base surface (the inline skater can almost identically mimic a skier's movements when he/she has an external means of acceleration, i.e., the pulling transportation vehicle).

Two ski poles attach to the vehicle by universal joints, so that the pole handles or grips are free to move in the lateral and vertical planes. In addition, the poles connect to the drive-train in such a way, that by twisting them, the front two wheels steer the vehicle in either a left or right direction. Furthermore, the vehicle steers by operating hand throttles which control the individual right and left motor's rated of speed. Because of the vehicle's powerful and stable chassis, and its ability to be steered easily and accurately, the pulling vehicle provides a safe, fun, efficient and highly practical means of mobility for people of all ages.

The invention has now been explained with reference to specific embodiments. Other embodiments will be apparent to those of ordinary skill in the art. Therefore it is not intended that this invention be limited, except as indicated by the appended claims.

I claim:

1. A personal towing vehicle for towing a user comprising:

a chassis;

a first drag pole and a second drag pole, each with a ski-pole-like grip, each drag pole having a grip end and being coupled to the chassis through a corresponding universal joint, each drag pole being freely movable at the grip end in at least lateral directions in a plane normal to a travel direction without impacting steering, and the grip comprising means for steering the vehicle without restricting lateral hand and torso movement of the user;

at least three ground contact points, including at least one means mounted to said chassis for driving said vehicle, and at least one support element mounted to said chassis for balance and stable support of said chassis; and means mounted to said chassis and coupled to said driving means for powering said chassis and pulling said user solely by manipulation of each freely-moveable drag pole.

2. The vehicle according to claim 1 wherein said driving means comprises a drive wheel, and wherein said one support element comprises a coasting wheel.

3. The vehicle according to claim 1 wherein said driving means comprises first and second drive wheels mounted in parallel along an axle across said chassis, wherein said support element comprises a caster drag wheel, said universal joints being respectively mounted to said chassis adjacent said first and second drive wheels in order to permit steering by direct manual differential loading control of said drive wheels.

4. The vehicle according to claim 3 further including a steering mechanism for each said drive wheel for turning each said drive wheel relative to said chassis, said steering mechanism being controlled by angular rotation of said drag poles causing each said universal joint to rotate on a shaft.

5. The vehicle according to claim 4 further including:

an electric motor set, for providing independent power to each drive wheel.

6. The vehicle according to claim 5 further including means for controlling motor speed coupled in handles to each said drag pole for additional controlled steering of said drive wheels.

7. The vehicle according to claim 3 further including:

an electric motor set, for providing-independent power to each drive wheel.

8. The vehicle according to claim 7 further including motor speed control means coupled in handles to each said drag pole for additional controlled steering of said drive wheels.

9. The vehicle according to claim 1 further including a steering mechanism for said driving means for turning said driving means relative to said chassis, said steering mechanism being additionally controlled by angular rotation of said at least one drag pole causing said universal joint to rotate on a shaft.

10. The vehicle according to claim 1 wherein said driving means comprises a drive track, and wherein said support element comprises a coasting rail, for operation on snow and ice surfaces.

11. The vehicle according to claim 10 wherein said driving means comprises first and second drive tracks mounted in parallel along an axle across said chassis, wherein said support element comprises a caster drag rail, and wherein said drag pole and universal joint comprise first and second drag poles mounted to respective first and second universal joints, said universal joints being respectively mounted to said chassis adjacent said first and second drive tracks in order to permit steering by direct manual differential loading control of said drive tracks.

12. The vehicle according to claim 11 further including a steering mechanism for each said drive track for turning each said drive track relative to said chassis, said steering mechanism being controlled by angular rotation of said drag poles causing each said universal joint to rotate on a shaft.

13. The vehicle according to claim 12 further including:

an electric motor set, for providing independent power to each drive wheel.

14. The vehicle according to claim 13 further including means for controlling motor speed coupled in handles to each said drag pole for additional controlled steering of said drive tracks.

15. The vehicle according to claim 11 further including:

an electric motor set, for providing independent power to each drive track.

16. The vehicle according to claim 15 further including means for controlling motor speed coupled in handles to each said drag pole means for additional controlled steering of said drive tracks.

17. The vehicle according to claim 1 wherein said driving means comprises first and second drive wheels mounted in parallel along an axle across said chassis, wherein said support element comprises a caster drag wheel, said universal joints being respectively mounted to said chassis adjacent said first and second drive wheels in order to permit steering by direct manual differential loading control of said drive wheels, further comprising:

an electric motor set for providing independent power to each drive wheel; and a battery pack removably mounted on said chassis between said first and second drive wheels and said drag wheel.

18. The vehicle according to claim 1 further including a quick release for disconnecting said drag pole from said chassis.

19. The vehicle according to claim 1 further including means for connecting a drag harness to said chassis, the drag harness for attaching to a user's torso, so that loading through the drag poles to a user's arms can be reduced while providing additional mechanical dragged-load-bearing capability.

20. The vehicle according to claim 1 wherein said powering means comprises a motor generator set, for powering and braking said drive means by means of regenerative braking, said regenerative braking for charging an electric power source of said powering means.

21. personal towing vehicle for towing a user comprising:

a chassis;

a first drag pole and a second drag pole, each with a ski-pole-like grip, each drag pole being coupled to the chassis through a corresponding universal joint, each drag pole being freely movable at one end in a plane normal to a travel direction without impacting steering, and the grip comprising means for steering the vehicle without restricting lateral hand and torso movement of the user;

at least three ground contact points, including at least one means mounted to said chassis for driving said vehicle, and at least one support element mounted to said chassis for balance and stable support of said chassis;

an electric motor set for providing independent power to each drive wheel;

a battery pack removably mounted on said chassis between said first and second drive wheels and said drag wheel;

means mounted to said chassis and coupled to said driving means for powering said chassis and pulling said user solely by manipulation of each freely-moveable drag pole, wherein said driving means comprises first and second drive wheels mounted in parallel along an axle across said chassis, wherein said support element comprises a caster drag wheel, said universal joints being respectively mounted to said chassis adjacent said first and second drive wheels in order to permit steering by direct manual differential loading control of said drive wheels; and a battery mount for securing said battery pack to said chassis, said battery mount comprising a gate pivotally mounted to said chassis, wherein said caster drag wheel is mounted to said gate, said battery pack providing ballast weight upon said drag wheel to hold said gate in a closed position securing said battery pack to said chassis.

* * * * *